United States Patent
Godfrey et al.

(10) Patent No.: US 12,233,583 B2
(45) Date of Patent: Feb. 25, 2025

(54) MOLDING OF EXPANDABLE POLYSTYRENE

(71) Applicant: Lifoam Industries, LLC, Greer, SC (US)

(72) Inventors: Jonathan Godfrey, Joppa, MD (US); Saumitra Bhargava, Clarksville, MD (US); Michael W. Elliott, Aberdeen, MD (US); Gerry Babyok, Abingdon, MD (US)

(73) Assignee: LIFOAM INDUSTRIES, LLC, Greer, SC (US)

( * ) Notice: Subject to any disclaimer, the term of this patent is extended or adjusted under 35 U.S.C. 154(b) by 452 days.

(21) Appl. No.: 17/656,665

(22) Filed: Mar. 28, 2022

(65) Prior Publication Data

US 2023/0302692 A1    Sep. 28, 2023

(51) Int. Cl.
*B29C 44/34* (2006.01)
*B29C 44/42* (2006.01)
*B29K 25/00* (2006.01)
*B29K 105/04* (2006.01)

(52) U.S. Cl.
CPC ...... *B29C 44/3426* (2013.01); *B29C 44/3403* (2013.01); *B29C 44/3461* (2013.01); *B29C 44/354* (2013.01); *B29C 44/355* (2013.01); *B29C 44/42* (2013.01); *B29K 2025/06* (2013.01); *B29K 2105/048* (2013.01); *B29K 2995/0063* (2013.01); *B29K 2995/0082* (2013.01); *B29K 2995/0097* (2013.01)

(58) Field of Classification Search
CPC ............ B29C 45/7337; B29C 44/3434; B29C 44/343; B29C 35/04; B29C 33/048; B29C 33/04; B29C 44/3426
See application file for complete search history.

(56) References Cited

U.S. PATENT DOCUMENTS

| | | | |
|---|---|---|---|
| 8,984,827 | B2 | 3/2015 | Schreer |
| 10,688,698 | B2 | 6/2020 | Bhargava et al. |
| 2016/0332337 | A1 | 11/2016 | Reuber |
| 2022/0315723 | A1 | 6/2022 | Bhargava et al. |

FOREIGN PATENT DOCUMENTS

| | | |
|---|---|---|
| DE | 10 2020 105205 A | 9/2021 |
| DE | 102020105205 A1 | 9/2021 |
| EP | 0 303 270 A | 2/1989 |
| FR | 2953871 A1 | 6/2011 |
| WO | 2019/038574 A1 | 2/2019 |

OTHER PUBLICATIONS

International Search Report and Written Opinion, PCT/US2023/016528, dated Jun. 15, 2023 (15 pp.).
International Preliminary Report, PCT/US2023/016528, dated Sep. 24, 2024 (9 pp.).

*Primary Examiner* — Stella K Yi
(74) *Attorney, Agent, or Firm* — Eversheds Sutherland (US) LLP (57) ABSTRACT

Methods of making molded polystyrene articles are described. The methods include introducing steam into a mold simultaneously to filling the mold with foam particles, and cooling the mold without the use of cooling water. The method can be performed faster and with a lower temperature differential than conventional molding processes, permitting faster turn-around to the production of subsequent molded articles. The molded articles produced by the method can have thicker side walls, improved foam particle fusion, and improved compression properties as compared to conventional EPS molding processes.

23 Claims, 3 Drawing Sheets

MOLDING OF EXPANDABLE POLYSTYRENE

FIELD OF THE DISCLOSURE

This disclosure relates generally to molded expandable polystyrene bead foam and methods of making molded expandable polystyrene bead foam articles and, in particular, relates to thicker and stronger molded bead foam expandable polystyrene articles and methods of making thicker and stronger molded bead foam expandable polystyrene articles.

BACKGROUND

Molded expandable polystyrene bead foam articles are commonly used in thermal insulation, impact protection, building construction, and/or lost foam casting applications. Expandable polystyrene (EPS) is a widely used bead foam material having a well-established manufacturing process that is easily reproducible. EPS is the highest volume molded product in the shortest amount of time.

Conventional EPS shape molding. i.e. molding of EPS into specific shapes rather than molding EPS blocks and machining the block into a shape, involves injecting foam particles into a mold, subjecting the mold to steam, cooling with water, and subjecting the mold to a negative pressure. Due to control systems in conventional molding systems, it is impossible to pass steam through the mold simultaneous to either filling the mold with foam particles or to subjecting the mold to a negative pressure during fill. As a result, steam penetration into the center of the bead foam mass can vary widely depending on the geometry and thickness of the mold, resulting in poor fusion of the foam particles in molded articles and limiting the molded articles to a thickness of around 2.5 inches (63.5 mm) or less. A molded EPS article having poor uniformity in the fusion of the foam particles will subsequently have poor thermal, mechanical, and impact properties. Poor uniformity in foam particle fusion results in brittle or over-heated regions in the molded article.

Furthermore, conventional EPS shape molding includes the application of a cooling water to both cool the mold and the article through evaporative cooling during the molding process. This water is typically industrially treated, non-potable water that creates an environment for microbial growth on the surface and in the gaps between foam beads. Certain EPS articles produced using conventional methods intended for use in shipping medicinal commodities are sterilized to account for this microbial growth.

Further still, EPS articles intended for use as geofoam must meet the requirements of ASTM D6817, which establishes minimum performance requirements for geofoam applications. EPS articles formed through conventional block molding processes must be trimmed and compressed in order to pass ASTM D6817, a process which results in non-isotropic properties, loss of EPS material from trimming and, additional time and energy requirements.

To prevent poor fusion of foam particles and reduce variability in performance, conventional bead foam molding limits the thickness of molded expandable polystyrene articles. Thus, manufacturers and consumers must choose between increased thickness of molded expandable polystyrene articles and the structural integrity of those articles.

Previous attempts to modify the conventional bead foam molding process include removal of any introduction of steam in favor of pre-heating the mold prior to foam particle introduction, as described in U.S. Pat. No. 10,688,698 to Lifoam Industries LLC. That method, which was limited to parts having thicknesses between about 0.5 inches (12.7 mm) to about 1.5 inches (38.1 mm), describes the making of a molded foam article from homopolymers, graft polymers, or copolymer of polylactic acid through the elimination of steam or other heating medium.

Accordingly, improved methods of molding expandable polystyrene are needed for overcoming one or more of the technical challenges described above.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Methods of making molded expandable polystyrene articles are provided herein including methods of making thicker expandable polystyrene shape molded articles having improved bead fusion and reduced microbe growth with reduced density variation at a lower overall average density compared to molded expandable polystyrene articles produced using conventional bead foam shape molding methods, particularly at densities between about 1.2 pcf (19.22 kg/m$^3$) and 1.5 pcf (24.28 kg/m$^3$). In particular, it has been discovered that (i) simultaneously injecting steam into a mold cavity during foam particle introduction improves wetting of the foam particles, and (ii) omitting any cooling water during the shape molding process reduces microbial colonies on surface by 2 to 3 orders of magnitude. Furthermore, simultaneous injection of steam during foam particle introduction and omission of cooling water results in EPS articles having reduced density variation suitable for use in construction applications, such as geofoam, without subsequent trimming or compression processes. In some embodiments, the method includes applying a slight negative pressure of around −1.5 inHg (−5.08 kPa) to around −2 inHg (−6.77 kPa) simultaneously with steam injection and foam particle introduction, thereby permitting greater control over the temperature of the foam particles during molding. The methods of making molded expandable polystyrene articles provided herein may be used to produce molded expandable polystyrene articles having any suitable thickness, including thicknesses of 3 inches (76 mm) or greater with fusion of the foam particles equal to or superior to EPS articles of lesser thicknesses and increased density uniformity.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

As used herein, the term "about" with reference to dimensions refers to the dimension plus or minus 10%.

As used herein, "conventional methods" or "conventional EPS shape molding processes" refer to the formation of uniquely shaped molded articles using the typical EPS molding process which (i) does not include simultaneous introduction of steam during the step of filling the mold with foam particles, and/or (ii) includes cooling water during the molding process. The introduction of steam during particle fill is impossible in conventional EPS shape molding processes due to control systems designed to prevent steam waste. Conventional EPS shape molding processes are also characterized by the use of cooling water during the molding process.

As used herein, "conventional EPS block molding" refers to the formation of large, monolithic blocks of EPS. These blocks of EPS must go through secondary processes such as subtractive machining to produce a specific shape, resulting in between about 5% to about 70% loss of material as waste, depending on the application. As used herein, "cooling water," in the context of conventional EPS block molding, refers to subjecting the exterior of the mold to cooling water, sometimes in the form of a spray, to reduce the temperature of the mold and the article within through evaporative cooling.

Methods of shape molding expandable polystyrene are disclosed herein. In some preferred embodiments, the method includes (i) introducing foam particles formed of expandable polystyrene into a mold for an article while simultaneously introducing steam into the mold. In some embodiments, the method includes (ii) applying a negative pressure cycle, in the absence of cooling water, in which the foam particles are expanded and fused together to form the article, and then (iii) removing the molded foam article from the mold. That is, the methods described herein may be performed without the introduction of traditional cooling water on the article surface or external mold surface.

As used herein, "expansion" of foam particles refers to the process by which foam particles enlarge in size, reducing in density while growing more malleable. Since foam particles suitable for molding are typically spherical or cylindrical and include a blowing agent that facilitates expansion, the expansion of the foam particles permits neighboring foam particles to fill in spaces between neighboring particles, regardless of the particles' shapes. The expansion of the foam particles is necessary for successful molding.

As used herein, applying a "negative pressure" refers to subjecting the system to a slight negative pressure. As used herein, a "slight negative pressure" refers to subjecting the system to a negative pressure of from about −1.5 inHg (−5.08 kPa) to about −8 inHg (−27.09 kPa), such as from about −0.5 inHg (−1.69 kPa) to about −2 inHg (−6.77 kPa). Conventional EPS molding processes typically subject the mold to a negative pressure of −20 inHg (−67.73 kPa) to −28 inHg (−94.82 kPa).

As used herein, "fusion" of the foam particles refers to the process by which foam particles bond and adhere to one another by some intermingling of polymer chains at the surfaces of foam particles in contact with one another, otherwise known as the "bead-to-bead interface." Following intermingling of polymer at the bead-to-bead interface, the foam particles require more than a nominal degree of force to be separated. Thus, a molded foam article is formed of fused foam particles. A molded foam article retains a shape as a result of the fusion of the foam particles forming the molded foam article. As used herein, the "degree of fusion" between particles correlates to how much force is required to separate the foam particles. Without intending to be bound by any particular theory, it is believed that the degree of fusion is also affected by the uniformity of foam particle fusion throughout a molded article. A greater degree of fusion corresponds to a greater amount of force required to separate the foam particles. A low degree of fusion between particles is characterized by a failure at the bead-to-bead interface, while a high degree of fusion is characterized by cellular fracture, i.e., a failure within the foam particles themselves. There is no standardized test for measuring a degree of fusion, but properties such as flexural strength and resistance to compression depend on the degree of fusion between the foam particles. Thus, the degree of fusion may be approximated through other tests designed to measure flexural strength or deflection force, allowing for a qualitative comparison among samples of molded articles to determine which possess "better fusion" of the foam particles in the molded articles.

One such test for observing fusion is referred to herein as the "cutting test," in which a molded foam article is cut with a non-serrated utility knife (e.g., a razor blade) to reveal the innermost foam particles. Upon cutting, some of the innermost foam particles are revealed to be completely loose and separated from the molded foam article. If the inner surface of the molded foam article is colored, such as through the application of a marker, uncolored areas represent voids that previously included poorly fused foam particles. A comparison of the amount of uncolored space between two samples, such as through surface metrology analysis, permits qualitative comparison of the fusion of the foam particles between the samples.

Another test that approximates the degree of fusion is the standard test specified by ASTM C203, which measures the flexural strength. Without intending to be bound by any particular theory, it is believed that foam particles that are fused more uniformly require more force to pull apart and break, while loose foam particles would separate more easily. Foam particles requiring greater force to pull apart and break correspond to a greater measured flexural strength, while loose foam particles that separate easily correspond to a lesser measured flexural strength. Thus, the flexural strength for a molded foam article with a greater degree of fusion would be greater than the flexural strength for a molded foam article having poorer fusion between the foam particles. In some embodiments, the molded foam article produced by the method has a greater flexural strength than a foam article molded using a conventional process, as measured by ASTM C203. High degree of fusion and/or high flexural strength allows articles to be lightweight and/or exhibit higher energy absorption during compression. Both are highly desirable for EPS molded articles.

Another test that approximates the degree of fusion is the ASTM C1621 standard test, which measures the compressibility of molded foam articles by measuring the compressive strength at 10% deflection and post-compression recovery of a test sample from a molded foam article. Without intending to be bound by any particular theory, it is believed that foam particles that are fused more uniformly exhibit a higher compression resistance while loose beads would simply give way under the compressive force resulting in lower compression resistance. This test can be run on test samples selected from different locations in the molded article to quantify variability in compression properties. In some embodiments, the molded foam article produced by the method has a higher compressive strength than a foam article molded using a conventional process, as measured by ASTM C1621.

As used herein, a "mold" refers to a cavity having the shape of the molded foam article. The mold may have two or more separable parts that facilitate opening the mold for removal of the molded foam article. The separable parts of the mold may have a plurality of apertures or vents configured to permit the passage of gases, such as for the introduction of steam, water, and air or the removal of air, steam, and/or other gases through the application of a negative pressure.

In some embodiments, the method is effective to yield a molded article which has greater fusion uniformity than a foam article molded using a conventional process. That is, the degree to which foam particles are fused together within a molded article is consistent among different regions within the molded article. This is an advantageous result of the manner in which the foam particles are heated and wetted in the presently disclosed methods.

As described previously, the use of ASTM C203 and/or ASTM C1621 may allow approximation of the uniformity of foam particle fusion. When either or both of these tests are performed on multiple test samples from the same molded article, the uniformity of foam particle fusion may be approximated by evaluating the uniformity of the flexural strength and compressive strength measurements. Performing these ASTM tests on samples selected from multiple locations in the molded part provides the ability to quantify uniformity in degree of fusion and other properties. ASTM C1621 can be performed with samples selected from positioned located in vertical or horizontal directions to further quantify variation in properties as a function of vertical or horizontal position.

As used herein, "in the absence of cooling water" refers to the deliberate omission of any cooling water that is typically applied to the exterior of the mold in conventional EPS molding processes. Instead, only the negative pressure cycle is responsible for cooling during the molding process. It has been unexpectedly discovered that the omission of any cooling water during the molding process results in molded foam articles virtually free of microbes. Conventional EPS shape molding processes which rely on cooling water result in molded articles high in moisture, creating an environment in which microbes freely grow. This cooling water is necessary in conventional EPS shape molding processes because conventional EPS shape molding processes operate at temperatures that result in residual heat present in the molded article after molding, which may also contribute to the growth of microbes. As a result, molded articles produced by conventional EPS shape molding processes must be sterilized before use for sensitive applications such as shippers for food or medicine. Since the method as described herein omits the cooling water and operates at lower temperatures, molded foam articles produced as described herein are virtually free of microbes and may be used in applications such as, for example, shippers for food without an additional sterilization step, reducing costs and processing times. Furthermore, manufacturing techniques such as robot part handling and class VI environmental controls enable such shippers to reach medical sterility standards.

As used herein, an article that is "virtually free of microbes" refers to an article that is free of microorganisms such as bacterium immediately after formation by the processes described herein. As compared to conventional EPS shape molding processes, an article that is "virtually free of microbes" has a 99.999% reduction in microbial load, as measured by a modified ISO 11137 test. The ISO 11137 test is designed to measure the bioburden on sterilized health care products. The modified ISO 11137 used on the articles produced as described herein involves measuring bioburden upon receipt of the article and estimating bioburden when it would be received by a consumer.

Furthermore, water is increasingly becoming a precious resource that is scarce in many parts of the world. Industrial water usage is closely scrutinized, so removal of cooling water improves the environmental impact of the molding process. Removal of cooling water also permits the molding process to take place in climates where water is scarce, such as in more arid climates.

Conventional EPS block molding processes produce molded articles having residual heat, water, and pentane blowing agent. As the molded article stabilizes, residual heat, water, and pentane exit the molded article until it reaches equilibrium. Thus, molded articles must be allowed to cure for at least 24 hours to allow water, heat, and pentane to off-gas before the molded articles can be cut, CNC (computer numerical control) machined, or used for lost foam casting. In the methods described herein, thicker or more complex shape molded articles are produced and proceed through stabilization to reach an equilibrium within minutes or hours. As a result, the shape molded articles produced as described herein may be used, for example, in lost foam casting mere hours after molding and without any loss of material to a subsequent machining process. A further unexpected benefit of omitting cooling water, and omitting the typical cure time, is that molded articles produced as described herein have reduced weight variability because there is no residual cooling water to affect the weight.

It has been further unexpectedly discovered that mold life can be extended with the omission of cooling water. Molds used in EPS foam molding are typically aluminum and mounted on galvanized steel frames with galvanized heat chests that oxidize in the presence of water. Water on the surface of steel frames may also result in deposition of minerals upon drying or evaporation of water. Rust and minerals contaminate molded articles and interfere with mold apertures. Furthermore, omission of the cooling water results in a processing having a temperature swing reduced from conventional processes by about 30%, and the reduced temperature swing may also extend the life of the mold itself.

In some embodiments, the method includes introducing foam particles into the mold while simultaneously introducing steam into the mold. In conventional particle foam molding processes, control systems prevent users and/or the equipment from introducing steam during the particle filling step. Instead, users must first fill the mold with foam particles, and subsequently introduce steam. Such control systems are in place to prevent premature introduction of steam which, when combined with the cooling water characteristic of conventional EPS molding processes, results in a dramatic increase in condensation and either poor foam particle fill or surface defects. Furthermore, introducing steam during the filling process may result in some steam escaping the mold without wetting or heating the foam particles, resulting in some steam being "wasted." However, it has been unexpectedly discovered that introducing steam during the particle filling step, such as through the implementation of custom software, hardware, actuators, valves, or a combination thereof, can improve wetting of the foam particles compared to the introduction of steam after the foam particles have been introduced and settled within the mold. This simultaneous steam introduction during particle introduction unexpectedly permits the molding of thicker molded foam articles while maintaining or improving fusion of the foam particles as compared to conventional molding processes, even with lower overall steam consumption compared to conventional molding processes.

It has been further unexpectedly discovered that the simultaneous introduction of steam during particle fill and the omission of cooling water reduces density variation within the molded article. In some embodiments, the method is effective to yield a molded article which passes the standard defined by ASTM D6817 without any additional densification step or trimming step associated with conventional EPS block molding. ASTM D6817, titled "Standard Specification for Rigid Cellular Polystyrene Geofoam," is a specification that defines the physical properties and dimensions of EPS molded articles intended for use as geofoam. Among the required physical properties is the density of EPS geofoam. Conventional EPS block molding processes used for articles having a thickness greater than 3", which functionally lack steam during particle fill and require 24+ hours to stabilize, result in a molded article that either fails ASTM D6817 entirely, or has regimes within the molded article that fail ASTM D6817. The articles produced by the conventional EPS block molding process must be subjected to a secondary compression, referred to herein as an "additional densification step," whereby the molded article is trimmed, such as by cutting to remove material, and compressed. This compression step results in asymmetrical densification because compression can only be applied in a single direction. As a result, the compressive strength of the article varies along different axes, and the article must be oriented in a specific direction when implemented as geofoam. Molded articles produced as described herein, in contrast, do not require an additional densification step, so compressive strength is isotropic and may be implemented as geofoam in any orientation.

Furthermore, molded articles produced by conventional EPS block molding processes experience a greater deviation in weights and densities after curing. Since the molded articles intended for use as geofoam must next be subjected to trimming and densification, manufacturers utilizing the conventional block molding process must account for density variation in the geofoam article by producing molded articles having average densities ~20% higher than the minimum established by ASTM D6817 so that the lowest density within the article is above the requirement. Thus, meeting the requirements of ASTM D6817 requires more material and energy. By producing molded articles as described herein, molded articles can be molded at only around 5% greater than the minimum density, and successfully meet the requirements of ASTM D6817. Thus, molded articles produced as described herein reduce processing time, processing energy requirements, and material consumption, while simultaneously producing molded articles with isotropic density that has less variability across different molded articles.

Further still, molded articles produced as described herein may have any suitable thickness as a result of the simultaneous introduction of steam during particle fill, as described above. Large molded articles, such as those for use as Structural Insulated Panels (SIPS) for building passive homes, are typically formed from subtractive machining from large blocks of EPS foam produced by conventional EPS block molding processes or from fusing or combining two or more molded articles to produce a large molded article that cannot be singly produced by the conventional EPS block molding method. These disparate molded articles are typically fused by bracketing or special adhesive. However, the space separating these disparate molded articles, regardless of how tight molding tolerances are and the size of the gap, represent the area of greatest thermal energy transfer and the greatest insulation efficiency loss in such systems. By producing molded articles as described herein, molded articles intended for use as SIPS may be produced in the form of single, monolithic articles without gaps, significantly improving resistance to thermal energy transfer. Additionally, forming such larger SIPS directly from shape molding reduces the steps of fusing and installation of multiple disparate shape molded SIPS. Thus, significant material, time, and energy savings may be realized by eliminating the need for subtractive machining necessary to produce SIPS from EPS blocks.

Figure 1A:
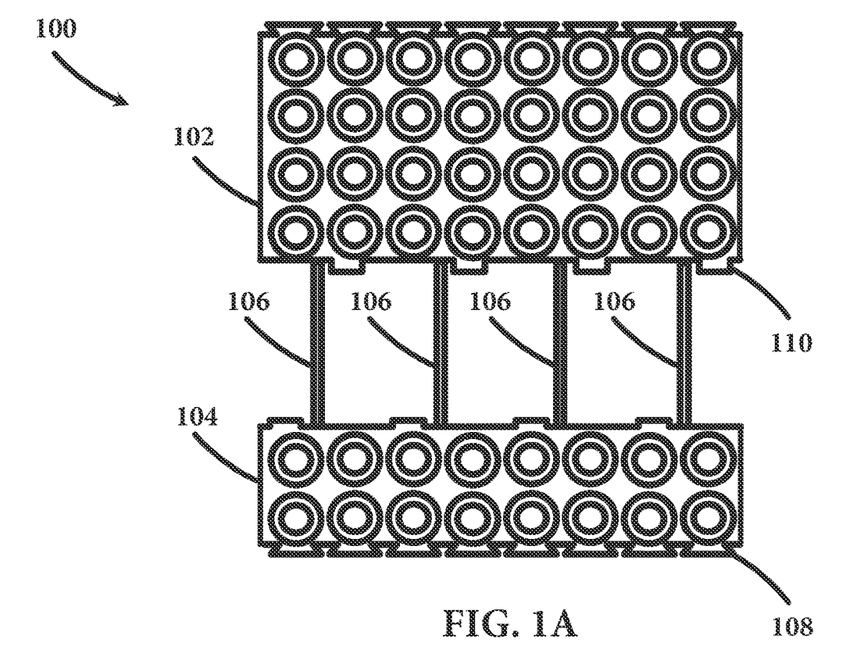
FIG. 1A is a cross-sectional view of a two-part structural insulation panel with interlocking surface, in accordance with the present invention.
Figure 1B:
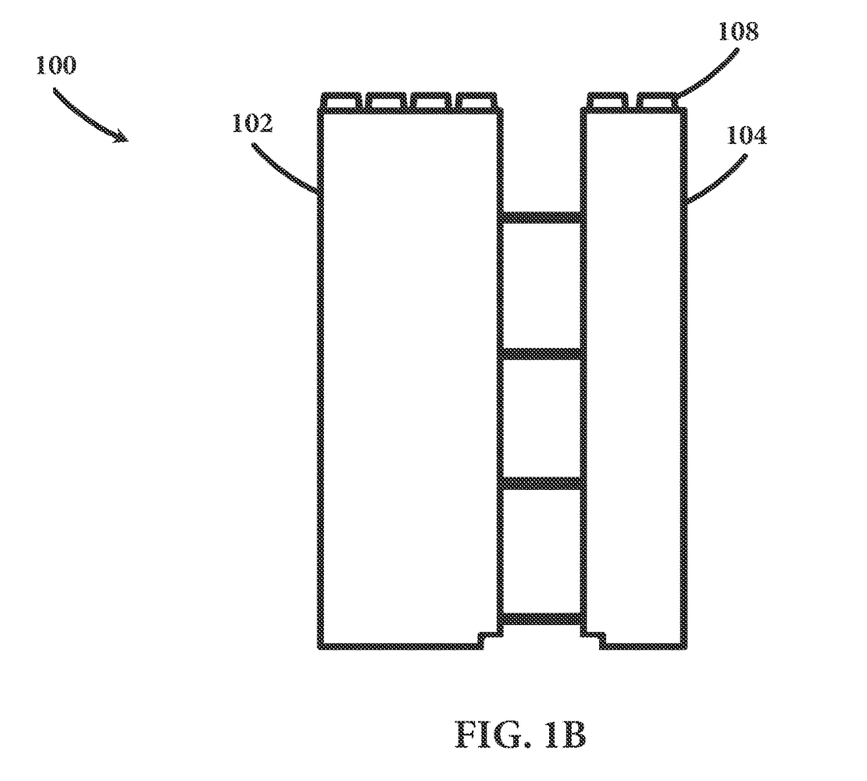
FIG. 1B is a cross-sectional view of a two-part structural insulation panel with interlocking surface, in accordance with the present invention.

FIGS. 1A and 1B depict an exemplary molded article produced utilizing the process enclosed herein. Molded expandable polystyrene articles produced by conventional methods are limited in thickness and when structural insulated panels exceed 2.5 inches (63.5 mm) in thickness, multiple panels must be glued or interlocked to create thicknesses greater than 2.5 inches (63.5 mm). Poor adhesion or interlock creates leaks or gaps between neighboring panels which lowers the thermal performance, in addition to increased processing time necessary combine panels into a thick panel. FIGS. 1A and 1B depict an exemplary molded article 100 including a 4 inch (101.6 mm) structural panel 102 joined to a 2 inch (50.8 mm) structural panel 104 by a number of plastic stabilizers 106. A number of features are present on structural panels 102, 104 that are created during the molding process, such as interlocking features 108 and supporting columns 110.

The embodiment illustrated in FIGS. 1A and 1B include multiple features imparted during the molding step without the need for secondary steps such as CNC-machining. Thus, patterns and/or edge features may be incorporated onto the molded article that enhance connectivity of neighboring molded articles by inclusion of puzzle piece-like edges, improve error-proofing when aligning neighboring molded articles by inclusion of visual alignment indicators, and/or improve resistance to breakage by shear forces by inclusion of crosshatch patterning.

Figure 2:
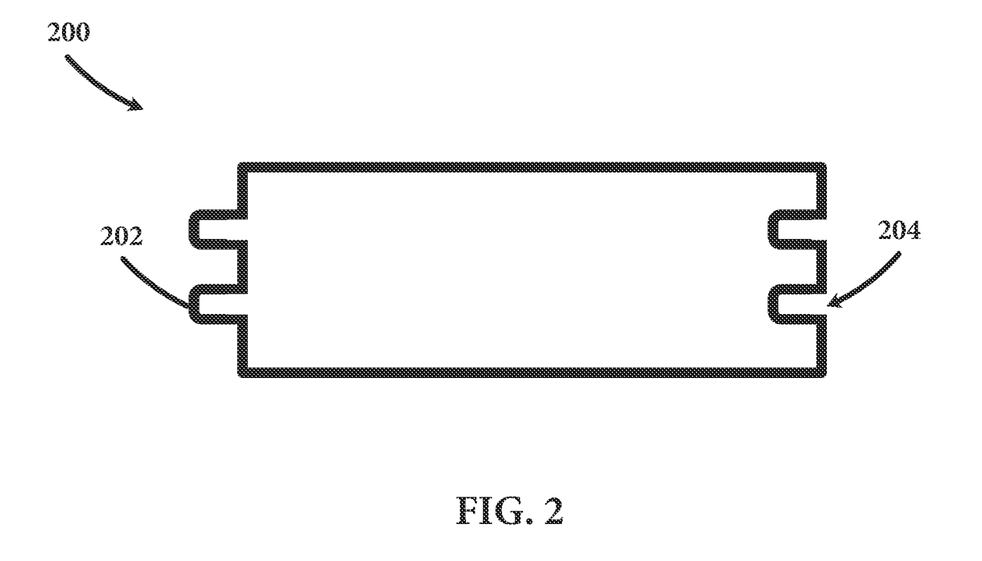
FIG. 2 is a cross-sectional view of a molded article in accordance with the present invention.
Figure 3:
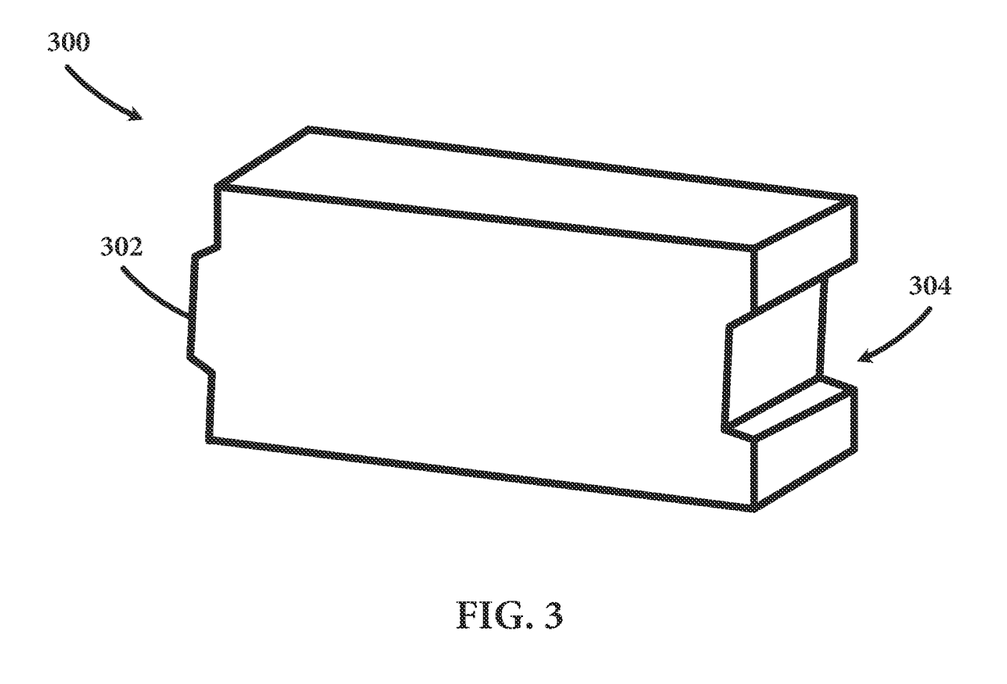
FIG. 3 is a cross-sectional view of a molded article in accordance with the present invention.

FIGS. 2 and 3 each depict another example of a molded expandable polystyrene article 200, 300 with each dimension exceeding about 6 inches (about 152 mm) having interlock features such as a protrusions 202, 302 and grooves 204, 304 configured to join neighboring molded expandable polystyrene articles. Incorporating such features in molded articles having dimensions of about 3 inches (about 76 mm) or greater produced by conventional EPS molding processes requires subtractive manufacturing whereby edge features or patterning is accomplished by removal of material, a costly, time consuming, and wasteful process that results in between about 5% to 70% loss of material. In contrast, these features are present in the articles molded by the methods described herein upon molding and require no additional trimming or CNC step, thereby reducing processing time and wasted material.

Figure 4:
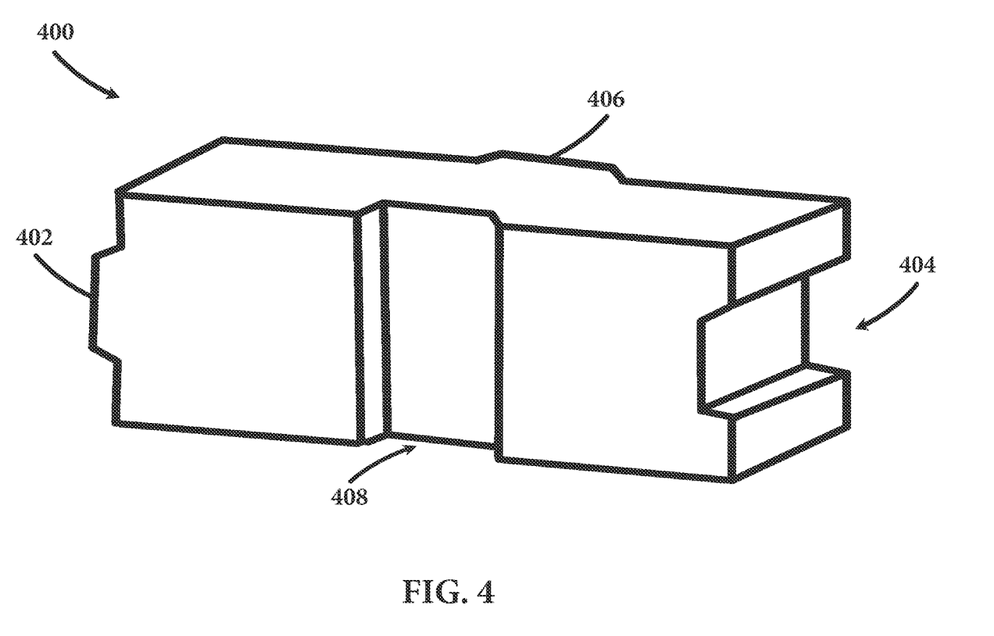
FIG. 4 is a perspective view of a molded article in accordance with the present invention.

FIG. 4 depicts another example of a molded expandable polystyrene article 400 with each dimension exceeding about 6" (about 152 mm) having first protrusion 402, first groove 404, second protrusion 406, and second groove 408 enabling formation of, for example, large wall-like structures from multiple pieces. Incorporating such features in molded articles 3" or thicker produced by conventional EPS molding processes requires subtractive manufacturing whereby edge features or patterning is accomplished by removal of material through a costly, time consuming, and wasteful process that results in 20-50% loss of material. In contrast, these features are present in the articles with each dimension exceeding about 6" (about 152 mm) molded by the methods described herein upon molding and require no additional trimming or CNC step, thereby reducing processing time and wasted material.

Lost foam casting is another application of molded articles that realizes benefits from the methods described herein. In this process, foam shapes are converted into exact metal shapes. The process begins by producing foam having the desired metal shape and then filling void space within and around the foam with sand or other media. Once the sand sets, molten metal is poured onto, within, and around the foam and sand, replacing the foam. However, molded articles for use in lost foam casting must have high compressive strength and low shrinkage in order to produce predictable results when in contact with molten metal. In order to ensure a molded article intended for use in lost foam casting has suitable compressive strength and low shrinkage, molded articles producing using conventional EPS molding processes must age and stabilize for between 10-18 weeks, according to the United States Department of Energy. In contrast, molded articles produced as described herein may be used in lost foam casting in 2 to 8 weeks or less.

In some embodiments, the method includes injecting steam into the mold while applying the negative pressure cycle in which the foam particles are expanded and fused together to form the article. In some embodiments, the method includes applying slight negative pressure to the mold simultaneously with the introduction of the foam particles and the steam. In conventional particle foam molding processes, control systems prevent users and/or the equipment from applying negative pressure during the particle filling step. Instead, users must first fill the mold with foam particles, subsequently introduce steam, and subsequently apply negative pressure. Such control systems are in place to prevent premature application of negative pressure which may result in higher steam consumption. However, it has been surprisingly found that applying controlled slight negative pressure during the introduction of foam particles and steam, such as through the implementation of custom software, hardware, actuators, valves, or a combination thereof, can improve wetting of the foam particles by better controlling the temperature of the foam particles. For example, one such method of controlling negative pressure has been achieved by using pneumatically actuated valves and adjusting the time and degree of opening. Without intending to be bound by any particular theory, it is believed that the simultaneous application of negative pressure while the foam particles and steam are introduced results in a greater number of foam particles to be wetted while minimizing the increase in temperature that results from introducing steam. Thus, the foam particles are wetted while preventing the premature expansion of the foam particles. This simultaneous slight negative pressure application and steam introduction during particle introduction unexpectedly permits the molding of thicker molded foam articles while maintaining or improving fusion of the foam particles. These advantages are realized even in the middle of the molded article. In conventional EPS shape molding, the bead foam particles in the middle of a thick part (i.e. greater than about 3 inches thick) rarely experience sufficient wetting or steam due to expansion of EPS bead foam near the mold walls occurring first, blocking the flow of steam to the middle of the article.

In some embodiments, wetting and heating foam particles introduced into the mold includes (a) introducing the foam particles into the mold, and then (b) introducing steam into the mold while venting the mold, wherein the venting subjects the mold to a near atmospheric pressure of between about 1.5 inHg (5.08 kPa) and about −0.5 inHg (−1.69 kPa). In conventional particle foam molding processes, control systems prevent users and/or the equipment from introducing steam while venting the system. Instead, conventional molding equipment is configured to be mounted on a steam chest so that steam can be introduced into the mold without permitting steam to escape, allowing steam to accumulate and surround the mold. These conventional systems prevent venting during steam introduction because some steam will escape the mold without wetting or heating the foam particles, resulting in some steam being "wasted." However, it has been surprisingly found that venting the mold while introducing steam, such as through the implementation of custom software, hardware, actuators, valves, or a combination thereof, can improve wetting of the foam particles without excessive heating of the foam particles. Without intending to be bound by any particular theory, it is believed that venting the mold during steam introduction allows for greater control over the temperature of the foam particles regardless of their location within the mold cavity so that the foam particles are wetted without exceeding the necessary temperature at which EPS beads expand.

As used herein, "collapsing" of the foam particles refers to the phenomenon in which the foam particles expand for an extended period of time, passing through the regime of decreasing density characteristic of expandable foams and entering a regime of increasing density. The increase in density results from the complete degas of a blowing agent, marking the end of the foam particle's ability to increase their volume further. When the blowing agent dissipates, and if the foam particles are still held above the glass transition temperature of polymer, the foam particles begin to decrease in size, resulting in an increased density. Foam particles that have collapsed are no longer suitable for molding because they lose the ability to fill in gaps that exist between neighboring foam particles.

In some embodiments, the steam introduced into the mold heats the mold to a first temperature. After the mold has been filled with foam particles, the mold is subsequently cooled, without the use of cooling water, to a second temperature during the negative pressure cycle. In some embodiments, the first temperature is less than 30° C. higher than the second temperature. In some embodiments, the first temperature is about 10° C. higher than the second temperature. In conventional molding systems that lack simultaneous steam introduction and particle filling, steam introduction during particle filling and application of negative pressure, steam introduction during particle filling and venting, or a combination thereof, the introduction of steam results in a temperature increase of 40° C. or greater. Conventional expandable polystyrene (EPS) molding processes have a ΔT of 45-60° C. depending on the machine and/or process. Thus, it has been unexpectedly discovered that simultaneous steaming, particle filling, negative pressure application, and/or venting results in a reduction in the ΔT of the system by greater than 50% without the need to use cooling water. By reducing the maximum temperature of the system, the molding process may be accomplished in a shorter period, and with lower energy consumption in the form of less steam consumed in the molding step, than as compared to processes that use a conventional molding system. Furthermore, a reduced ΔT reduces the time necessary to prepare the mold for a subsequent molding process, reducing the turn-around time for producing multiple molded articles.

The molded foam articles produced by the method may have any suitable thickness. In some embodiments, the molded foam article produced by the method has a thickness in at least one dimension of 0.5 inches (12.7 mm) or greater. In some embodiments, the molded foam article produced by the method has a thickness of at least 2.5 inches (63.5 mm) in at least one dimension. As used herein, the "thickness" of a molded foam article refers to the smallest dimension of the molded foam article. In other words, a molded foam article in the form of a monolithic panel has a relatively large length and width, but a relatively small thickness. For example, a molded foam panel may have a length of 8 inches, a width of 10 inches, and a thickness of 2.5 inches (63.5 mm). Another example of a molded foam article is a molded box having five sides. The box may be 8 inches×6 inches×10 inches (203.2 mm×152.4 mm×254 mm) with a side-wall thickness of 1.5 inches (38.1 mm). In conventional molding systems, the ability to introduce steam to wet and heat the foam particles only after they have been introduced into the mold has limited the thickness of the molded foam article because steam is unable to penetrate more than approximately 1.5 inch (38.1 mm) into the foam particle mass. For this reason, the majority of molded foam articles produced by conventional processes have a thickness of between 1-3 inches (25.4-76.2 mm), such as a molded box that is 8 inches×6 inches×10 inches (203.2 mm×152.4 mm×254 mm) with a sidewall thickness of 2 inches (50.8 mm). Thus, it has been unexpectedly discovered that simultaneous steaming, particle filling, negative pressure application, and/or venting allows for molding foam articles having thicknesses greater than those possible in conventional molding systems, i.e., greater than 3 inches (76.2 mm). This permits the formation of boxes having the same internal volume as those formed by conventional processes, but with thicker sidewalls and superior thermal performance.

In some embodiments, the overall molding time of the method for molding the foam article is up to 50% less than an overall molding time of a conventional expandable polystyrene shape molding process for the same foam article. As used herein, the "overall molding time" of a process involves every step from closure of the mold to opening of the mold, including foam particle introduction, steam introduction, and application of negative pressure. The time prior to closure of the mold can vary widely based on the equipment used, such as the equipment used for actuating the mold halves, and on the geometry of the molded article. Conventional molding processes include a number of sequential steps, including particle filling, hydraulics, direct steaming, cooling, and stabilization/hold. Conventional expandable polystyrene (EPS) molding processes, considered the "fastest" commercial molding processes, have an overall molding time of around 30-65 seconds depending on the dimensions of the molded article. The method described herein has an overall molding time that is at least 10% less than the overall molding time of an EPS process for the same geometry. The method described herein has an overall molding time of around 25-50 seconds or less depending on the dimensions of the molded article.

In some embodiments, both the foam particles and the steam are introduced into the mold using one or more fill injectors, wherein both the foam particles and the steam are introduced into at least one fill injector at an upstream location effective to permit mixing of the foam particles and steam within the at least one fill injector. As used herein, a "fill injector" refers to a retractable valve flush with the interior of the mold cavity configured to retract from the mold cavity wall, permitting the introduction of the contents of the fill injector. In conventional molding processes that utilize a fill injector, the foam particles are prevented from contacting steam or other heating medium until after the foam particles have been introduced into the mold and the fill injector has been closed, thereby preventing premature expansion of the foam particles that are still in the fill injector. As described previously, the foam particles are prevented from contacting steam or other heating medium through the use of control systems. However, it has been surprisingly found that introducing both the foam particles and steam into the fill injector at an upstream location, such as through the implementation of custom software, hardware, actuators, valves, or a combination thereof, can result in mixing of the foam particles and steam within the fill injector, which improves wetting and heating of the foam particles and thereby improves fusion of the foam particles when molded.

In some embodiments, the foam particles are pre-treated with steam before introduction into the mold, such as through the introduction of steam on a conveying pipe or a foam particle hopper that feeds foam particles to the molding equipment. In some embodiments, the foam particles are pre-treated with steam on a conveying pipe or in a foam particle hopper before being introduced into a fill injector, where the foam particles are subsequently treated and mixed with additional steam before introduction into the mold, where the foam particles are subsequently treated with additional steam. Without intending to be bound by any particular theory, it is believed that pre-treating the foam particles with steam prior to introduction into the mold, or prior to introduction into a fill injector, can improve the wetting of the particles prior to the introduction of steam into the mold and subsequently improving the fusion of the foam particles when molded.

In some embodiments, the steam is introduced into the mold at an angle tangential to a side of the mold so as to agitate the foam particles with the mold and improve wetting of the foam particles. For example, a mold having a substantially cylindrical shape may have steam introduced at an angle tangential to the circular cross-section of the cylindrical shape, resulting in a tortious effect on the foam particles so that they rotate within the mold.

In some embodiments, the EPS "B-sized" beads, having a size range of between 0.7 to 1.4 mm (pre-expanded) may be used in the methods described herein. In other embodiments, "A-sized" beads having a size range of between 1.1 to 1.7 mm, "C-sized" beads having a size range of between 0.4 to 0.8 mm, or "T-sized" beads having a size range of between 0.2 to 0.5 mm may be used with similar improvements in uniformity and cycle time reduction. In some embodiments, EPS beads having a size range from 0.1 to 3.5 mm are suitable for use in the methods described herein.

In some embodiments, a blowing agent such as pentane is present in the foam particles at concentrations between about 2% to about 6% by weight.

In some embodiments, the foam particles are formed of homopolymers, graft polymers, or copolymers of polystyrene.

Examples

The present disclosure may be further understood with reference to the following non-limiting examples.

Example 1: Comparison with Conventional Molding Process for 2.5" Panels

Molded articles were produced as described herein and compared to molded articles produced by a conventional EPS process. All tested molded articles were formed from expandable polystyrene from "B-sized" pre-expanded beads. The molded articles produced as described herein were 6 inches (152.4 mm) thick, while those produced by the conventional EPS process were 2.5 inches (63.5 mm) thick. All tested molded articles were molded in a Kurtz Ersa Corporation K68 HP5 Top-Line molding machine, available commercially from Kurtz Ersa Corporation, Kreuzwertheim, Germany. By default, the pressure of incoming steam in this machine was 40 psi (275.8 kPa), but the steam pressure was reduced to 20 psi (137.9 kPa). The standard steam valves were relocated closer to the steam chest to more rapidly deliver steam. A conventional mold was used for all tested molded articles having 10 mm core vent slots. In order to produce thicker parts, extension rings were installed to increase the volume of the steam chest. The molding machine was modified with custom software to enable the simultaneous introduction of steam during foam particle introduction for the production of the molded articles as described herein, while the typical steam constraints present in conventional EPS processes were maintained for producing molded articles using the conventional EPS process. The process parameters are presented in Table 1.

TABLE 1

Process Parameters for Comparison with Conventional EPS Process

| Traditional EPS Process on 2.5" Panel | | | New Process on 6" Panel | | | Comparison Vs |
|---|---|---|---|---|---|---|
| Step | Time (sec) | % of Total | Step | Time (sec) | % of Total | Traditional EPS |
| Fill | 10.5 | 19% | Steam + Fill | 12 | 24% | +1.5 sec |
| Hydraulics | 8 | 15% | Hydraulics | 8 | 16% | +0.0 sec |
| Direct Steam | 18 | 33% | Direct Steam | 11.5 | 23% | −6.5 sec |
| Cooling Water + Air | 2.5 | 5% | Cooling Water | 0 | 0% | +0.0 sec |
| Stabilization | 15 | 27% | Stabilization | 15 | 30% | +0.0 sec |
| Cycle Pause | 1 | 2% | Cycle Pause | 1 | 2% | +0.0 sec |
| Total Time | 55 | | Total Time | 49.5 | | −5.5 sec |
| Total Steam Time | 18 | | Total Steam Time | 17.5 | | −0.5 sec |
| Max Temp | 108.0 | | Max Temp | 106.0 | | −2.0° C. |
| Min Temp | 80.0 | | Min Temp | 86.0 | | +6.0° C. |
| Difference | 28.0 | | Temp Diff Overall | 20.0 | | −8.0° C. |

As shown in Table 1, the method as described herein may produce molded articles 10% faster than the conventional EPS process despite being 240% thicker. At the same thickness, the method as described herein molded articles 100% faster. Less time is needed for steam because steam is introduced during fill. Furthermore, the overall temperature difference (ΔT) of the present method is 28% lower than the conventional EPS process, representing lower energy consumption and faster molding. Furthermore, the article that results from the method as described herein may go through further processing in a matter of hours, instead of the requisite ~24 hour cure time for the article produced by the conventional method, representing faster turn-around to molding of subsequent articles.

Example 2: Omission of Water in Traditional EPS Molding Process

An attempt was made to produce a molded article using the traditional EPS shape molding process described in Table 1, but without the application of cooling water. The resulting molded article exhibited post-expansion and bulging. An alternative to cooling water would be to extend the negative pressure cycle time by additional 20 seconds to cool and stabilize the part. However, despite the longer cycle and extended negative pressure cycle, the resulting part suffered from poor fusion and density variation.

Example 3: Testing Against ASTM D6817 for Inventive Method and Conventional EPS Process for EPS Grade 22

Molded articles were produced as described herein, and produced using the conventional EPS process, and their compressive resistance (CR) tested against ASTM D6817 for EPS Grade 22. The results are displayed in Table 2.

TABLE 2

Results of ASTM D6817 Test for Inventive Method and Conventional EPS Process for EPS Grade 22

| | Density (kg/m$^3$) | Direction of Force | CR at 10% deformation (kPa) | CR Standard Deviation | CR Variance | Ratio of Horizontal to Vertical CR |
|---|---|---|---|---|---|---|
| ASTM D6817 Minimum Reqs | 21.6 | N/A | 135 | N/A | N/A | N/A |
| 6" EPS New Process | 22.7 | Vertical | 151 | 0.2 | 0.9% | 0.977 |
| 6" EPS New Process | 22.7 | Horiz. | 148 | 0.2 | 0.9% | |
| EPS Block | 25.9 | Vert. | 246 | 1 | 2.8% | 0.913 |
| EPS Block | 25.9 | Horiz. | 225 | 1.2 | 3.7% | |

The molded article produced using the conventional EPS block molding process was initially in the form of a large, monolithic block that was trimmed and uniaxially densified to produce an article capable of passing ASTM D6817. In contrast, the molded article produced as described resulted in superior uniformity without any densifying step and, therefore, had a lower overall density.

As shown in Table 2, the density of the EPS blocks produced as described herein were 5% above the minimum required density established by ASTM D6817, while the EPS blocks produced by the conventional EPS process were about 20% greater. As described previously, this "overshoot" is necessary to account for density and weight variabilities that result from uneven heating and/or water evaporation during curing. The compressive resistance of the EPS blocks produced as described herein were about 10% greater than the ASTM D6817 requirement, while the compressive resistance of the EPS blocks produced by the conventional EPS method were 66% greater than the required compressive resistance, representing a substantial overshoot and significant wasted material. Finally, the ratio of compressive resistance in the horizontal and vertical directions had a difference of less than 2% for the EPS block produced as described herein, while the conventional EPS process produces blocks had a 10% difference between horizontal and vertical compressive resistances. This difference in compressive resistance also dictates how the block can be machined due to the non-isotropic mechanical properties. In other words, because the horizontal and vertical compressive resistance varies, the monolithic block produced by the conventional EPS process may only be used in one specific orientation, and may only be machined in a specific way. Improper machining or installation that fails to consider the non-isotropic mechanical properties dramatically increases the risk of premature failure or defect.

Example 4: Testing Against ASTM D6817 for Inventive Method for EPS Grade 19

Molded articles were produced as described herein and their compressive resistance (CR) was tested against ASTM D6817 for EPS Grade 19. The results are displayed in Table 3.

TABLE 3

Results of ASTM D6817 Test for Inventive Method and Conventional EPS Process for EPS Grade 19

| | Density (kg/m³) | Direction of Force | CR at 10% deformation (kPa) | CR Standard Deviation | CR Variance | Ratio of Horizontal to Vertical CR |
|---|---|---|---|---|---|---|
| ASTM D6817 Minimum Reqs. | 18.4 | N/A | 110 | N/A | N/A | N/A |
| 3" EPS New Process | 19.4 | Vert. | 122 | 0.2 | 1.1% | 0.983 |
| 3" EPS New Process | 19.4 | Horiz. | 120 | 0.2 | 1.1% | |

As shown in Table 3, the compressive resistance of the EPS blocks produced as described herein met all ASTM D6817 requirements while having less than 2% difference in compressive resistance in the horizontal and vertical directions.

Example 5: Comparison of Microbe Growth Between Inventive Method and Conventional EPS Process Four samples of EPS were produced by the method as described herein (without cooling water), and four samples were produced using the traditional process (with cooling water). The water was treated with conventional methods to control microbial level. These samples were handled by sterile gloves and placed in plastic bags to be analyzed for microbial load testing. All eight samples were subjected to two tests for microbial load. One test consisted of wiping a swab against the surface of the samples in several locations and then placing the swabs in agar overnight. Another test consisted of rinsing the samples with a culture medium and filtering it to concentrate the microbial load. The filtered membrane was inoculated on agar plates and left overnight. Both agar plates were measured the next day to examine the extent of microbial colony formation. Agar plates from both tests of the samples produced using the conventional EPS process showed between 1000 and 2000 microbial colonies when swabbing 9 in² (5,806 mm²) of the molded article. Agar plates from both tests of the samples produced as described herein showed 0 microbial colonies when swabbing 9 in² (5,806 mm²) of the molded article. This unexpected result reflects the sterility which has been obtained by removing cooling water in the method described herein and only using steam for heating and negative pressure for cooling.

Example 6: Comparison of Fusion and Density Uniformity

Sixteen molded articles were produced as described herein and their density and mechanical properties were measured and compared to traditionally molded block and shape molded samples. The density was measured according to ASTM C303, the flexural strength was measured according to ASTM C203, and the compression/deflection force was measured according to ASTM D1621 . . . . The average density, flexural strength, and deflection force, and the standard deviation of each, was recorded for the sixteen samples and the variances were calculated. The results are displayed in Table 4.

TABLE 4

Comparisons of Density and Fusion Uniformity for Inventive Method and Conventional Methods

| Process | Average Density (kg/m³) | Density Variance | Flexural Strength (kPa) | Flexural Strength Variance | Deflection Force (N) | Deflection Force Variance |
|---|---|---|---|---|---|---|
| Traditional Block Molded EPS 25.95 kg/m³ | 27.5 | 2.5% | 315 | 3.9% | 114 | 2.4% |
| Traditional Process EPS 19.22 kg/m³ | 20.7 | 3.1% | 210 | 3.9% | 86 | 4.7% |
| New Process EPS 22.75 kg/m³ | 22.9 | 1.2% | 292 | 2.4% | 100 | 1.5% |
| New Process EPS 19.22 kg/m³ | 19.6 | 1.4% | 239 | 2.6% | 93 | 1.2% |

As shown in Table 4, the samples produced as described herein had a density variance below 2% compared to the 2.5-3.1% variance in conventionally molded products. The samples produced as described herein had a flexural strength variance below 3% compared to the 3.9% flexural strength variance observed in conventionally molded products. The samples produced as described herein had a deflection force variance below 2% compared to the 2.4-4.7% variance in conventionally molded products. This 45-60% reduction in variance produces articles which are much more uniform in their weight and mechanical properties.

Example 7: Comparison of Flexural Strength and Deflection Force Scaled with Density The results from Example 6 were further analyzed to compare the flexural strength and deflection force of samples scaled by their density. The results are displayed in Table 5.

TABLE 5

Comparisons of Flexural Strength and Deflection Force scaled with Density

| Process | Flexural Strength (mpa) per 1 kg/m³ of density | Deflection Force (N) per 1 kg/m³ of density |
|---|---|---|
| Traditional Block Molded EPS 25.95 kg/m³ | 0.0114 | 4.17 |
| Traditional Process EPS 19.22 kg/m³ | 0.0101 | 4.15 |
| New Process EPS 22.75 kg/m³ | 0.0127 | 4.35 |
| New Process EPS 19.22 kg/m³ | 0.0122 | 4.76 |

As shown in Table 5, the samples produced as described herein show a significant improvement in flexural strength and deflection force compared to samples produced by conventional methods.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirt and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure it not to be seen as limited by the foregoing described, but is only limited by the scope of the appended claims.

That which is claimed is:

1. A method of making a molded foam article, comprising:
   (i) introducing foam particles comprising polystyrene into a mold for an article while simultaneously introducing steam into the mold;
   (ii) subjecting the mold to direct steaming; and then
   (iii) subjecting the mold to a negative pressure cycle, in the absence of cooling water, in which the foam particles are expanded and fused together to form the article; and then
   (iv) removing the molded foam article from the mold.

2. The method of claim 1, wherein step (ii) comprises direct steaming from 10%-50% shorter as compared to a conventional EPS molding process.

3. The method of claim 1, wherein step (i) further comprises subjecting the mold to slight negative pressure simultaneously with the introduction of the foam particles and the steam.

4. The method of claim 1, wherein step (i) comprises (a) introducing the foam particles into the mold, and then (b) introducing steam into the mold while venting the mold.

5. The method of claim 1, wherein:
   steam heats the mold to a first temperature, and then
   the mold, following filling of the foam particles, is cooled, without the use of cooling water, to a second temperature during the negative pressure cycle, and
   the first temperature is from 5 to 25° C. higher than the second temperature.

6. The method of claim 5, wherein the first temperature is 10° C., 15° C., or 20° C. higher than the second temperature.

7. The method of claim 1, wherein the molded foam article has a thickness from 0.3 inches (7.62 mm) to 72 inches (1.83 m) in at least one dimension.

8. The method of claim 1, wherein the molded foam article has a thickness of greater than 3 inches (76.2 mm).

9. The method of claim 1, wherein the method is effective to yield a molded foam article having a thickness of greater than 3 inches without any machining step.

10. The method of claim 1, wherein the method is effective to yield a molded foam article having 99.999% lower microbial loading without any additional sterilization step, as compared to a conventional EPS molding process.

11. The method of claim 1, wherein the method is effective to yield a molded foam article which has a greater flexural strength than a foam article molded using a conventional process, as measured by ASTM C203.

12. The method of claim 1, wherein the method is effective to yield a molded foam article which has greater compressive resistance than a foam article molded using a conventional EPS molding process, as measured by ASTM C1621.

13. The method of claim 1, wherein the method is effective to yield a molded foam article which has a ratio of horizontal compressive resistance to vertical compressive resistance of between about 0.95 and 1.05.

14. The method of claim 1, wherein the method is effective to yield a molded foam article which passes the standard defined by ASTM D6817 without any additional densification step or trimming step.

15. The method of claim 1, wherein the method is effective to yield a molded foam article which has greater fusion uniformity than a foam article molded using a conventional process.

16. The method of claim 1, wherein the method is effective to yield a molded foam article with reduced density variation than a foam article molded using a conventional process.

17. The method of claim 1, wherein the method is effective to yield a molded foam article with a density variation of less than 2%.

18. The method of claim 1, which has an overall molding time that is at least 10% less than an overall molding time of a conventional expandable polystyrene shape molding process.

19. The method of claim 1, wherein both the foam particles and the steam are introduced into the mold using one or more fill injectors, wherein both the foam particles and the steam are introduced into at least one fill injector at an upstream location effective to mix the foam particles and steam within the at least one fill injector.

20. The method of claim 1, wherein the foam particles are pre-treated with steam in a hopper or filling tank before introduction into the mold.

21. The method of claim 1, wherein steam is introduced into the mold at an angle effective to agitate the foam particles within the mold.

22. The method of claim 1, wherein the foam particles comprise homopolymers, graft polymers, or copolymers of polystyrene.

23. The method of claim 22, wherein the foam particles further comprise one or more additives and/or fillers.

* * * * *